US012600012B2

(12) United States Patent
Mazursky et al.

(10) Patent No.: US 12,600,012 B2
(45) Date of Patent: Apr. 14, 2026

(54) WORK-HOLDING AND MOLDING DEVICE FOR VARIABLE IRREGULAR SHAPES

(71) Applicants: Hernan Mazursky, San Diego, CA (US); Luis Adolfo Mazursky, San Diego, CA (US); Alexis Mazursky, San Diego, CA (US)

(72) Inventors: Hernan Mazursky, San Diego, CA (US); Luis Adolfo Mazursky, San Diego, CA (US); Alexis Mazursky, San Diego, CA (US)

( * ) Notice: Subject to any disclaimer, the term of this patent is extended or adjusted under 35 U.S.C. 154(b) by 429 days.

(21) Appl. No.: 17/888,221

(22) Filed: Aug. 15, 2022

(65) Prior Publication Data

US 2023/0053111 A1 Feb. 16, 2023

Related U.S. Application Data

(60) Provisional application No. 63/233,260, filed on Aug. 14, 2021.

(51) Int. Cl.
| | |
|---|---|
| *B25B 5/06* | (2006.01) |
| *B23Q 1/03* | (2006.01) |
| *B25B 1/20* | (2006.01) |
| *B25B 1/24* | (2006.01) |

(52) U.S. Cl.
CPC .............. *B25B 5/061* (2013.01); *B23Q 1/035* (2013.01); *B25B 1/20* (2013.01); *B25B 1/2421* (2013.01)

(58) Field of Classification Search
CPC ........ B25B 5/061; B25B 1/2415–2421; B25B 1/00; B25B 1/20; B25B 1/2457; B23Q 1/035; B23Q 1/037

USPC ................ 269/20, 265–270, 43, 45; 294/902
See application file for complete search history.

(56) References Cited

U.S. PATENT DOCUMENTS

| | | | | |
|---|---|---|---|---|
| 2,754,708 | A | 7/1956 | Peterson | |
| 3,942,778 | A | 3/1976 | Fadiga et al. | |
| 4,284,267 | A * | 8/1981 | Marben ................. | B25B 1/2421 269/266 |
| 4,697,799 | A | 10/1987 | Wickham et al. | |
| 4,770,455 | A | 9/1988 | Collins, Jr. | |
| 5,457,868 | A * | 10/1995 | Blaimschein ......... | B25B 11/007 269/21 |
| 5,887,430 | A * | 3/1999 | Hirai ....................... | B25B 5/061 191/10 |
| 6,711,797 | B1 * | 3/2004 | Bennett ................... | B41F 15/18 29/559 |
| 2019/0210217 | A1 * | 7/2019 | Jetté ........................ | B25J 9/0069 |
| 2022/0134496 | A1 * | 5/2022 | Urfer ..................... | B23Q 3/065 269/20 |

(Continued)

FOREIGN PATENT DOCUMENTS

| | | |
|---|---|---|
| DE | 19547027 A1 | 6/1997 |
| GB | 894421 A | 4/1962 |

*Primary Examiner* — Michael A Gump

(57) ABSTRACT

A work-holding device comprising a housing, at least one pin, a cover, and a flow regulation mechanism. The housing further comprising at least one chamber, the chambers having a first end, a second end, a fluid opening at the first end, and a pin opening at the second end. The pins having an actuating end and a base end. The pins are arranged in the chambers with the base end within the chamber and the actuating end extending through the pin opening. The flow regulation mechanism is attached to the cover and configured to regulate fluid flow into and out of the chambers.

8 Claims, 23 Drawing Sheets

(56)       References Cited

U.S. PATENT DOCUMENTS

2022/0176504 A1 *  6/2022  Chen ...................... B23Q 1/035

* cited by examiner

WORK-HOLDING AND MOLDING DEVICE FOR VARIABLE IRREGULAR SHAPES

FIELD OF THE INVENTION

The present invention relates generally to work-holding and molding devices and more specifically to devices which can hold in position objects of different shapes and sizes such as irregular shapes or surfaces that otherwise are problematic to be held with traditional clamping devices.

BACKGROUND OF THE INVENTION

Vices and like clamps or other work-holders used along the industry rely on parallel flat surfaces in opposition displacing against each other to make contact with the element to be fixed in place, when the elements have enough contact surface and the forces applied to the element are able to restrict the element's movement, avoiding displacements and allowing the application of the necessary operations on the element. The devices currently in the market usually are able to limit one degree of freedom per device used, to limit more degrees more than one device is required.

When the element's surfaces are irregular in shape, a device with parallel flat surfaces in opposition displacing against each other to fix an element is not adequate for the task, lacking enough contact surface for the applied force to restrict the element's movement. For these cases, a mold or die or similar tool has to be custom made creating a negative mold that will only serve a purpose to this particular element or application. There is an elevated cost associated to this practice having to design, manufacture and stock these tools as accessories for each particular application.

DETAIL DESCRIPTIONS OF THE INVENTION

Figure 1:
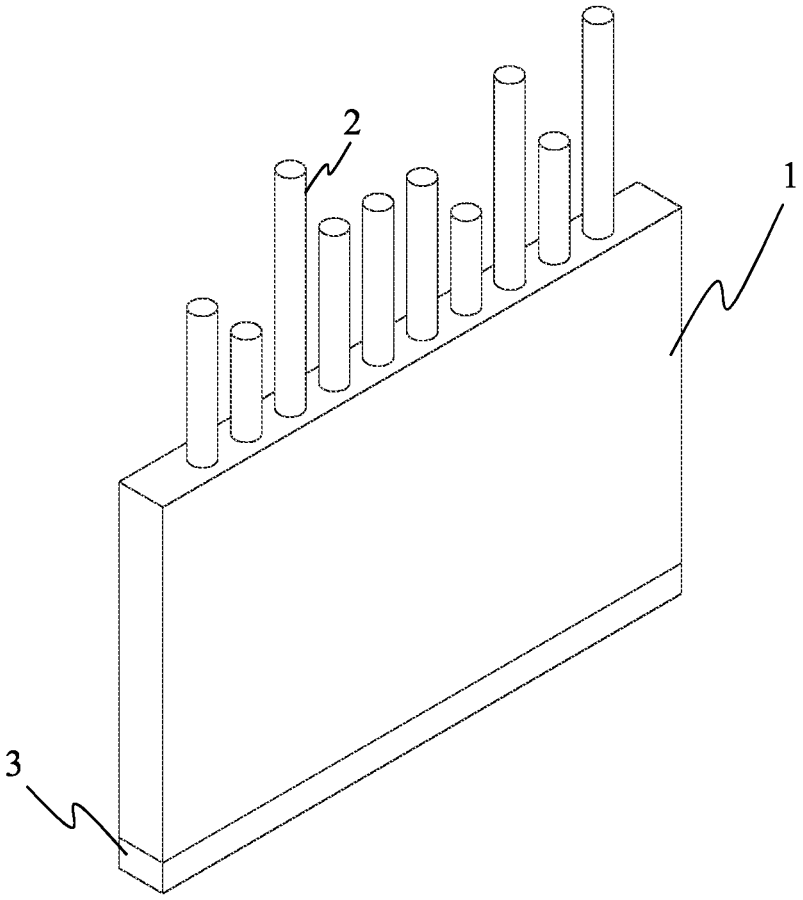
FIG. 1 is a top front perspective view of the present invention in accordance with at least one embodiment.
Figure 2:
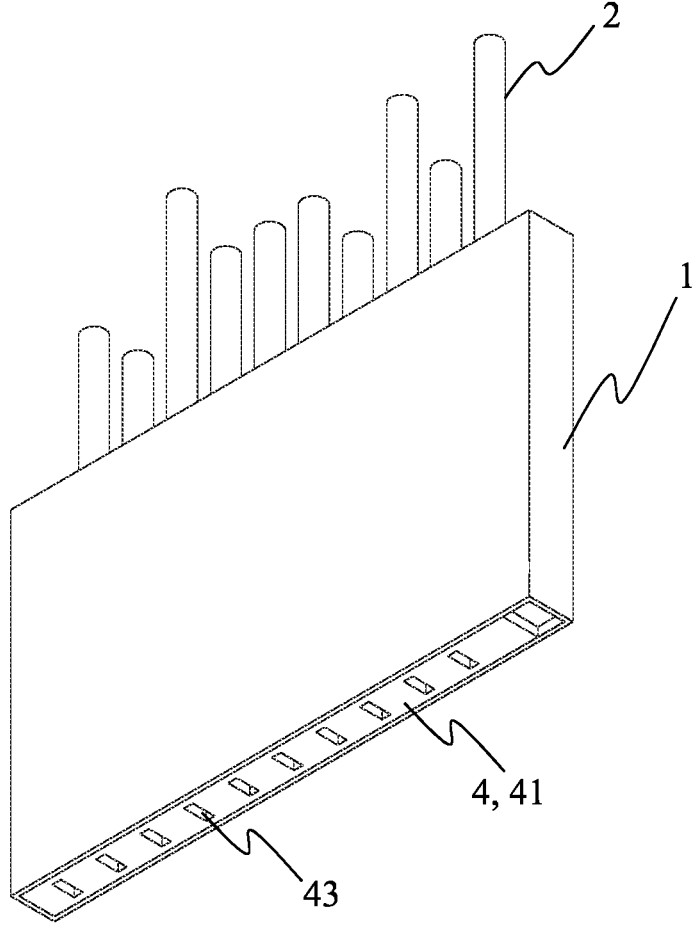
FIG. 2 is a bottom rear perspective view of the present invention in accordance with at least one embodiment, with the cover unmounted.
Figure 3:
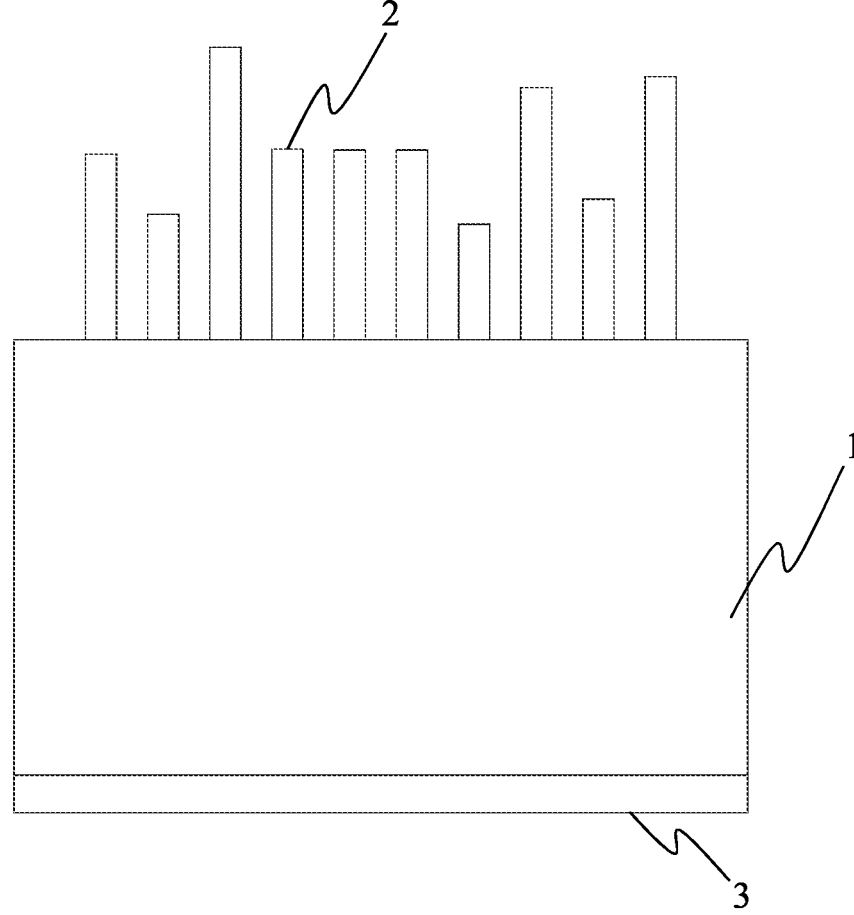
FIG. 3 is a front elevation view of the present invention in accordance with at least one embodiment.
Figure 4:
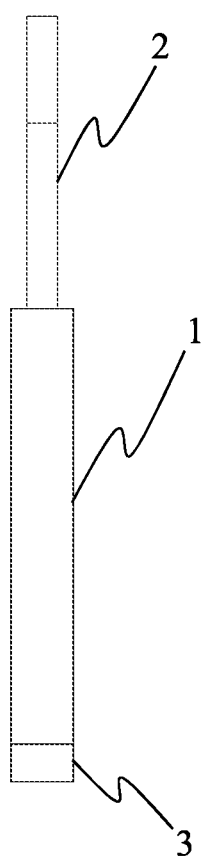
FIG. 4 is a side elevation view of the present invention in accordance with at least one embodiment.
Figure 5:
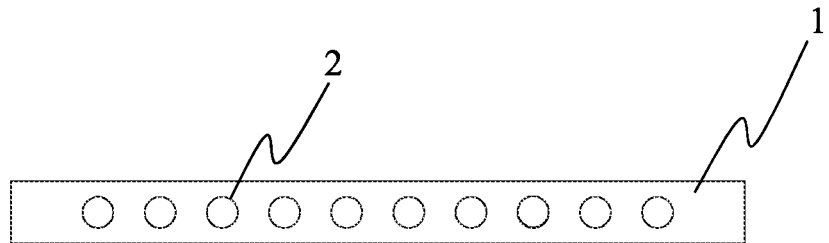
FIG. 5 is a top plan view of the present invention in accordance with at least one embodiment.

All illustrations of the drawings are for the purpose of describing selected versions of the present invention and are not intended to limit the scope of the present invention. The present invention and various alternate embodiments are described with reference to details discussed below.

Furthermore, the accompanying drawings aim to illustrate the present invention and by no means limit the scope of the present invention or its alternate embodiments. Specific details are described to provide a thorough understanding of the present invention and its alternate embodiments. However, in certain instances, well-known or conventional details are not described in order to provide a concise discussion.

Reference in the specification to "one embodiment", "an embodiment" or "alternate embodiment" means that a particular feature, structure, or characteristic described in conjunction with the embodiment is included in at least one embodiment of the invention. The phrase "in one embodiment" in the specification, is not necessarily referring to the same embodiment, but rather to a parameters and specifications regarding the embodiment in question.

Referring to FIG. 1-15, the work-holding device of the present invention comprises a housing 1 and at least one pin 2. The housing 1 further comprises at least one chamber 11, each of the at least one chamber 11 having a first end 12 and a second end 13. The at least one pin 2 is preferably cylindrical in shape, having an actuating end 21 and a base end 22. Each pin of the at least one pin 2 is positioned within one of the at least one chamber 11, the base end 22 oriented toward the first end 12 and the actuating end 21 oriented toward the second end 13. The actuating end 21 is sized to protrude through a pin opening 14 at the second end 13 of the at least one chamber 11, while the base end 22 is sized to be unable to pass through the pin opening 14.

Preferably, the actuating end 21 is approximately the same size as the pin opening 14 as to form a guide bushing to brush debris off the at least one pin 2 as it passes through the pin opening 14, preventing debris from building up within the at least one chamber 11, further, a wiper seal may be employed at the pin opening 14.

The at least one chamber 11 further includes a fluid opening 15 at its first end 12, configured to allow flow of fluid into and out of the at least one chamber 11. The at least one pin 2 and the housing 1 are preferably made from a steel alloy, though other materials are acceptable. The actuating end 21 may be rounded or have filleted edges in some embodiments of the present invention. Within the at least one chamber 11, each of the at least one pin 2 is free to move linearly between the first end 12 and the second end 13 of the at least one chamber 11. For example, a pin may rest fully retracted with its base end 22 at the first end 12 of the chamber and its actuating end 21 at the second end 13 of the chamber or a pin may rest fully extended with its base end 22 at the second end 13 of the chamber and its actuating end 21 extended out of the chamber through the pin opening 14. The at least one pin 2 may be positioned at any point between fully retracted and fully extended as to have the actuating end 21 of each pin in a desired position.

The housing 1 further comprises a cover 3 positioned at the first end 12 of the at least one chamber 11. Just as the pin stroke is limited by the base end 22 being unable to pass through the pin opening 14 at the second end 13 of the at least one chamber 11, the pin stroke is limited by the base end 22 being unable to pass through the attached element, such as a perforated plate 41, seat plate, or cover 3 at the first end 12 of the at least one chamber 11.

In the preferred embodiment, the cover 3 comprises at least one main feeding port 55 allowing for fluid to access through the cover 3 to the fluid access port 31 and fluid opening 15 to the at least one chamber 11.

The action of the at least one pin 2 within the at least one chamber 11 may be actuated by hydraulic, pneumatic, or other powering means. Fluid may enter the at least one chamber 11 through the fluid opening 15, filling the at least one chamber 11 to the desired level and displacing the at least one pin 2 to the desired position. This system permits application of a great amount of clamping force while use of a pressure regulator may allow for fine adjustment in cases of delicate gripping in fragile applications. Each of the at least one pin 2 or the at least one chamber 11 may further comprise a seal to keep the chamber isolated, preferably installed in the pin opening 14 or base end 22, allowing the pressure to build up within the at least one chamber 11. The force with which the actuating end 21 of each of the at least one pin 2 contacts a workpiece is determined by the type of fluid and pressure of fluid introduced into the at least one chamber 11.

By extracting the fluid from the at least one chamber 11, the pins are forced to retract back into the housing 1 and stop making contact with the workpiece. The possibility of extending or retrieving the pins from the object allows for automatic or semi-automatic actuation of the embodiment. Also, pressure loss during fixturing can be automatically compensated by a pump 51 that assures to maintain the fluid line constantly pressurized, thus not affecting the applied force on the object being clamped.

Figure 20:
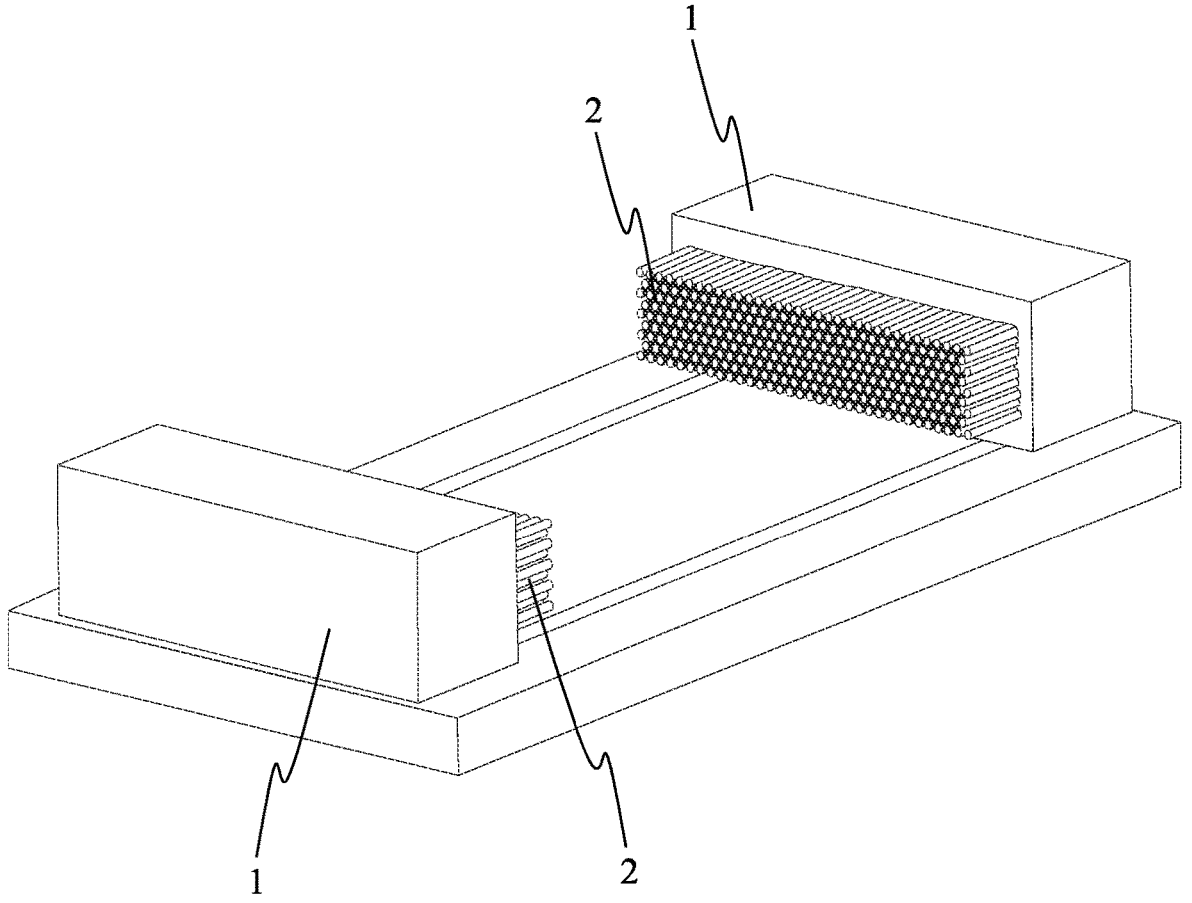
FIG. 20 is an exemplary illustration of a configuration of the present invention in accordance with at least one embodiment.
Figure 21:
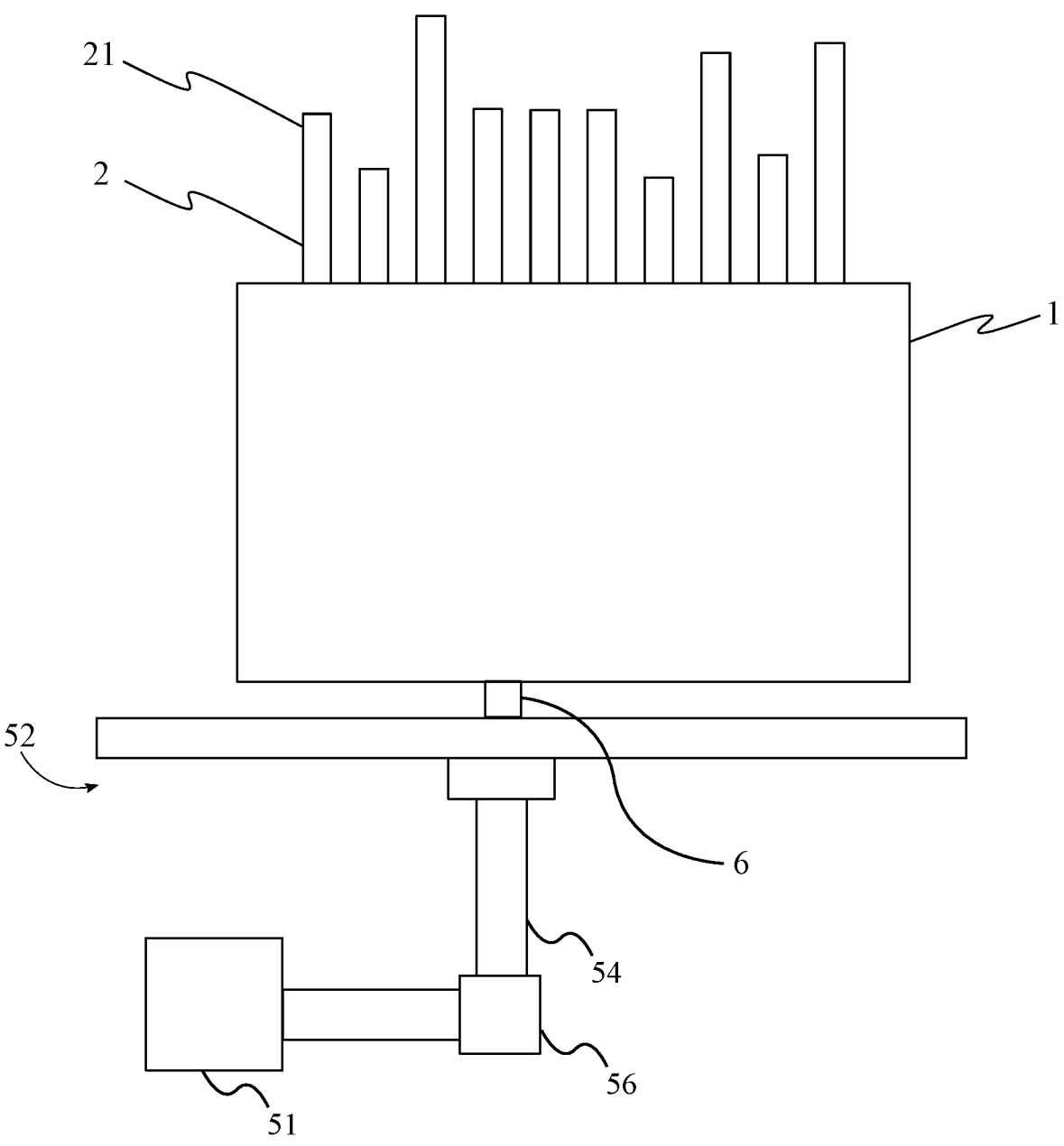
FIG. 21 is a front elevation view of the present invention in accordance with at least one embodiment.
Figure 22:
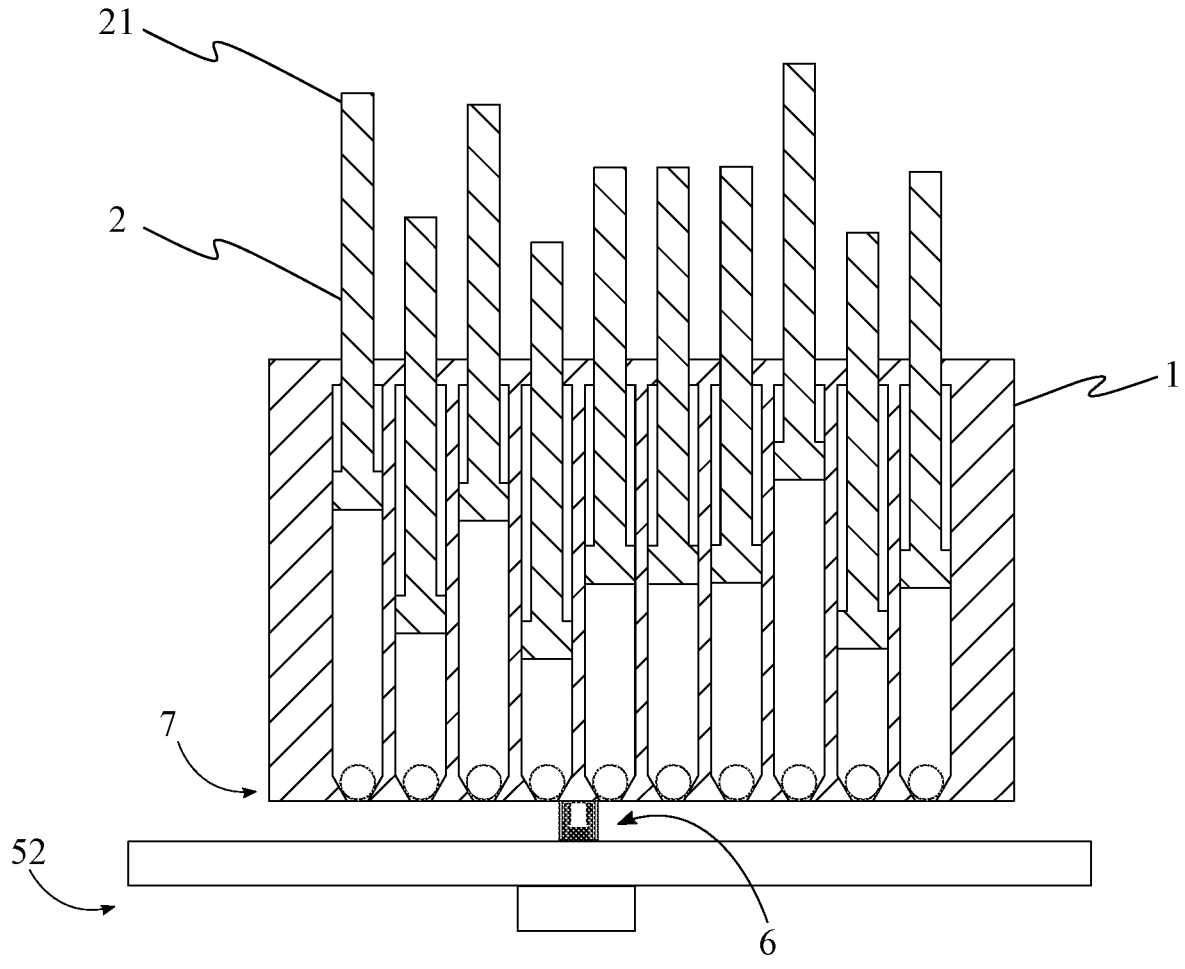
FIG. 22 is a section view of the present invention as seen in FIG. 21.
Figure 23:
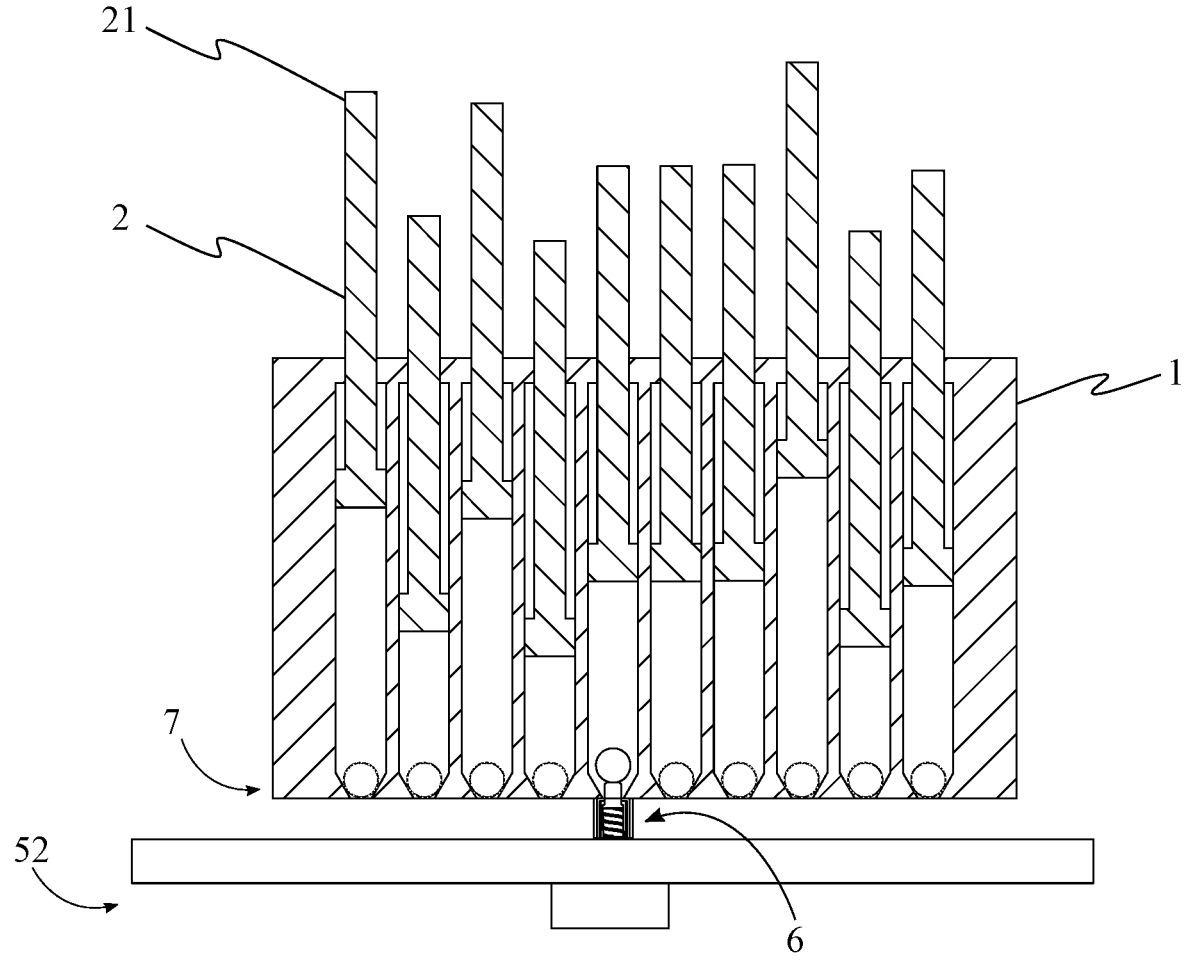
FIG. 23 is a section view of the present invention as seen in FIG. 21.

The present invention may be configured in a variety of ways depending on the workpiece being used and the work being done to the workpiece. The present invention may consist of a single chamber with a single pin, but in most cases will consist of multiple chambers and pins. In some cases, a single row of chambers and pins will be used, and in other cases, multiple rows of chambers and pins may be stacked together to create a grid. One row or grid of chambers and pins may be positioned across from another row or grid of chambers and pins to hold a workpiece from multiple sides. One exemplary illustration of a configuration of the present invention is shown in FIG. 20. The arrangement and configuration of multiples of the present invention is not limited to the examples discussed herein.

Figure 6:
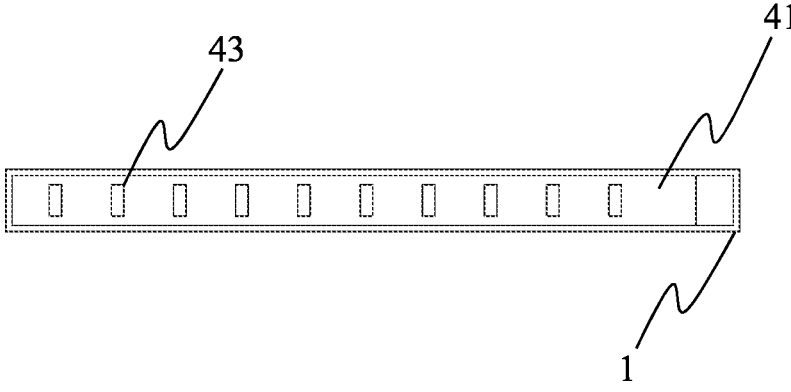
FIG. 6 is a bottom plan view of the present invention in a closed configuration in accordance with at least one embodiment, with the cover unmounted.
Figure 7:
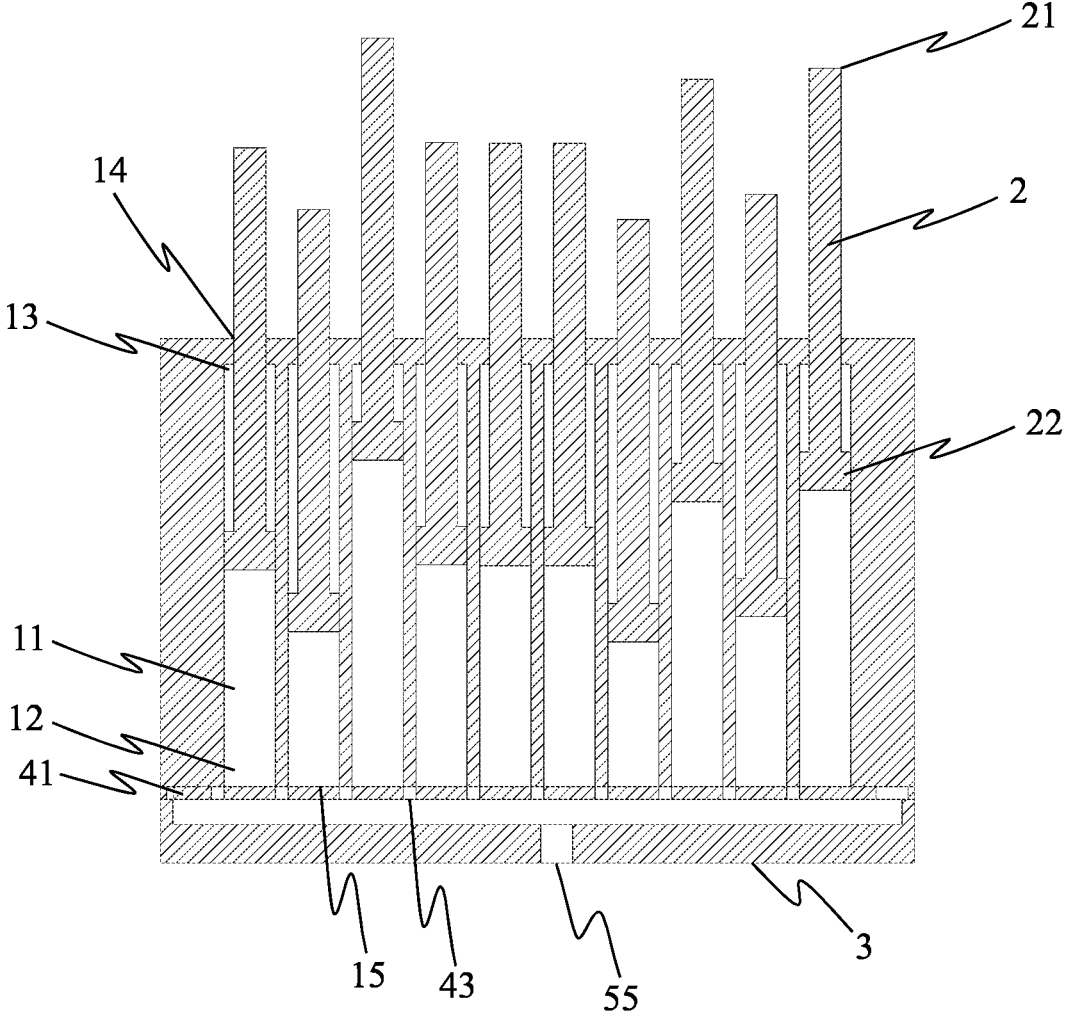
FIG. 7 is a section view of the present invention as seen in FIG. 3 in a closed configuration.
Figure 8:
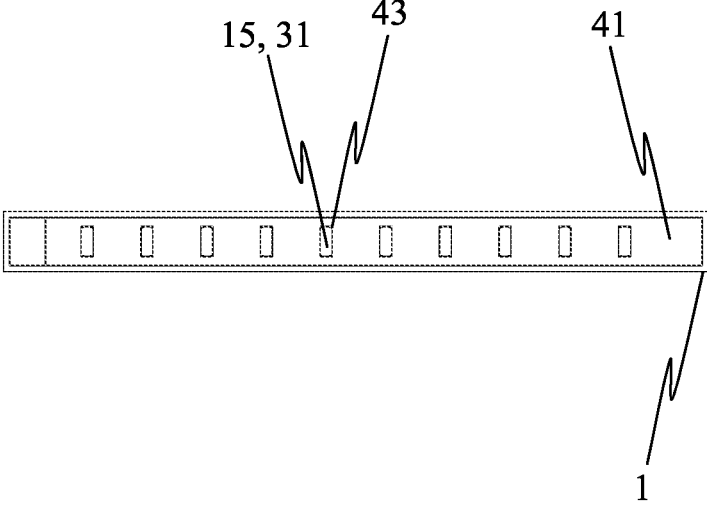
FIG. 8 is a bottom plan view of the present invention in an open configuration in accordance with at least one embodiment, with the cover unmounted.
Figure 9:
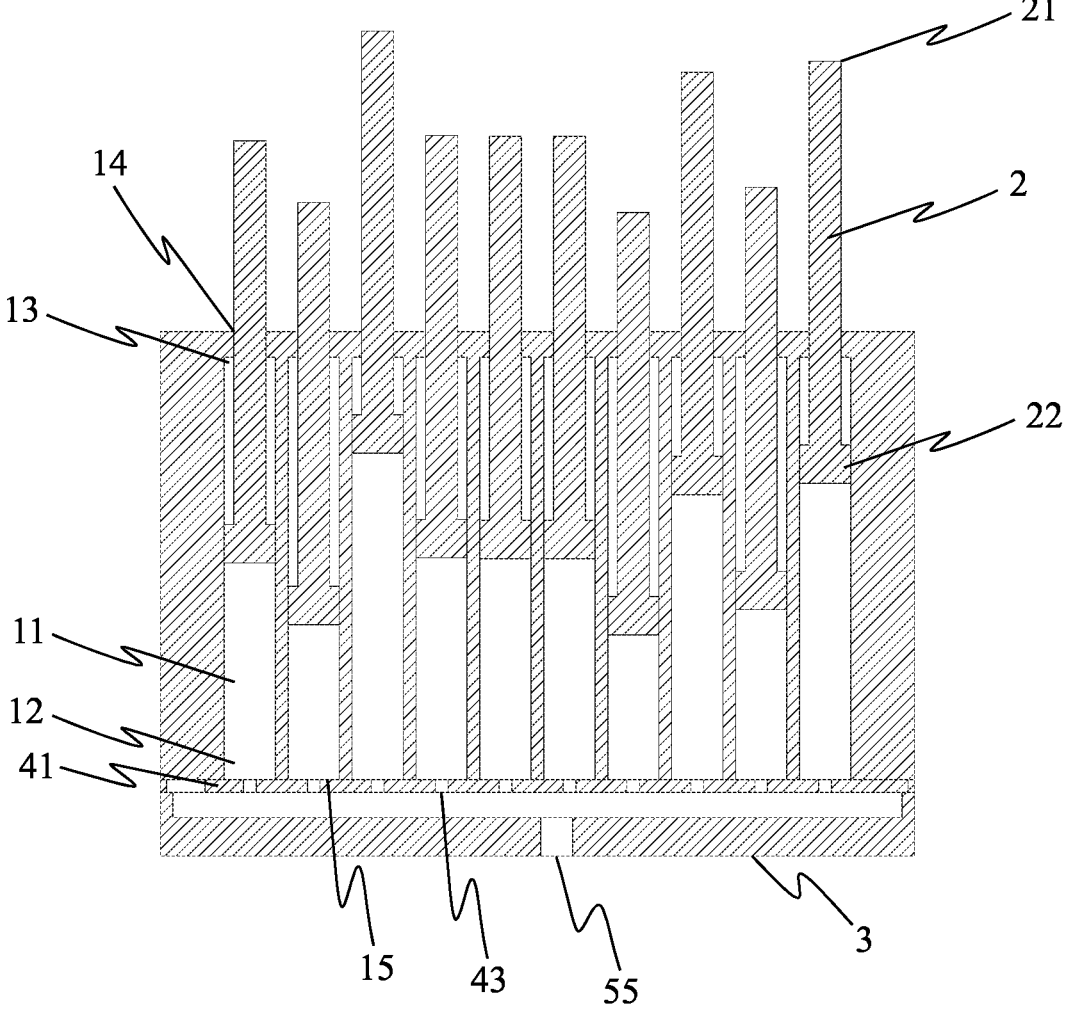
FIG. 9 is a section view of the present invention as seen in FIG. 3 in an open configuration.
Figure 10:
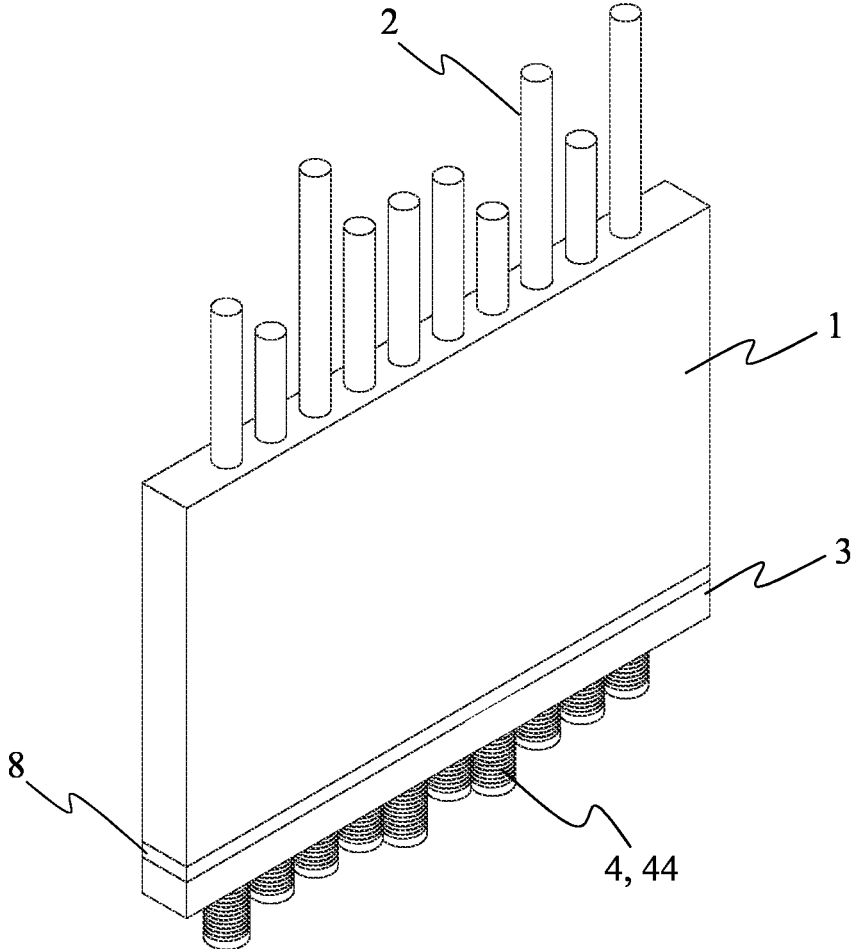
FIG. 10 is a top front perspective view of the present invention in accordance with at least one embodiment.
Figure 11:
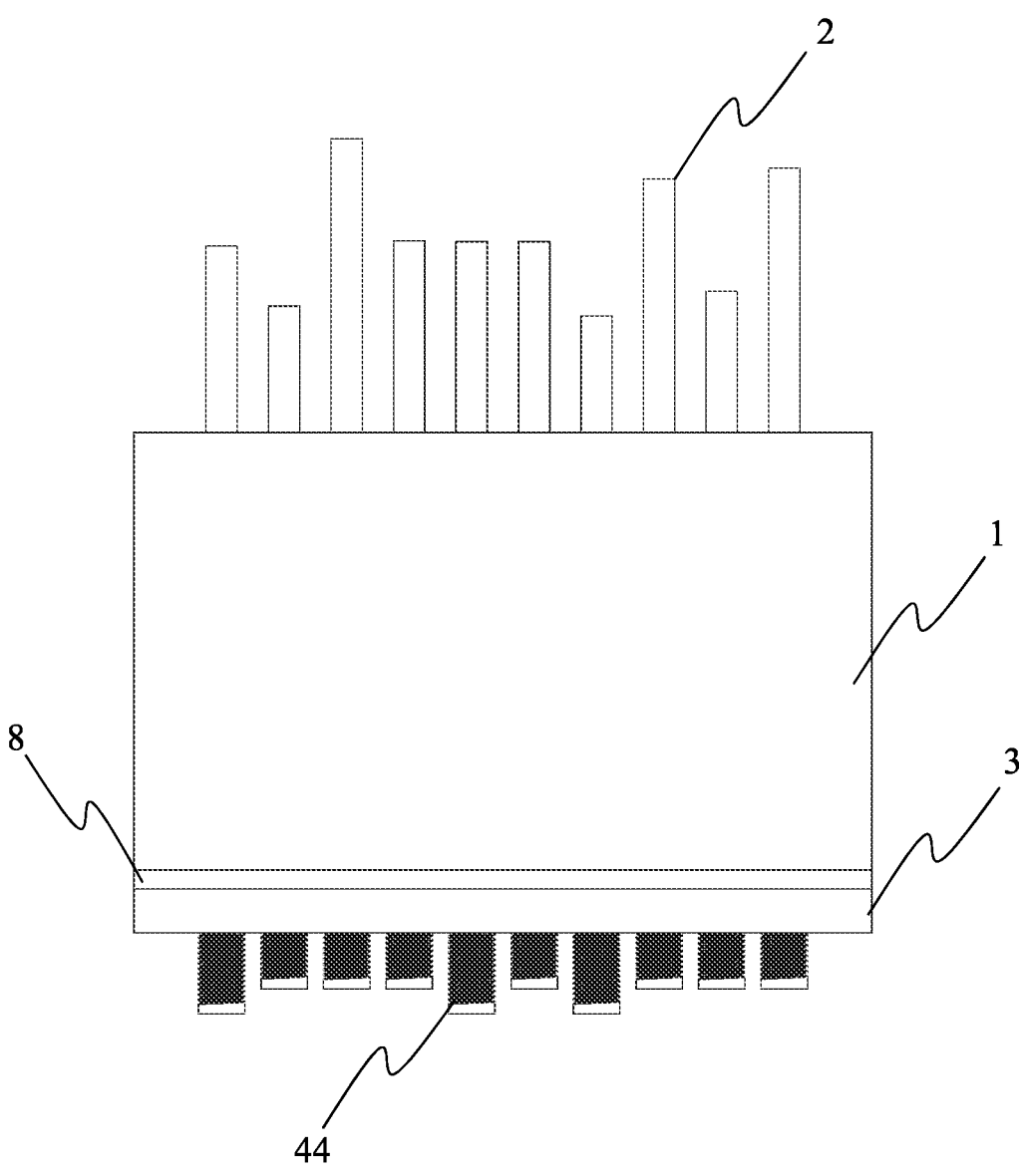
FIG. 11 is a front elevation view of the present invention in accordance with at least one embodiment.
Figure 12:
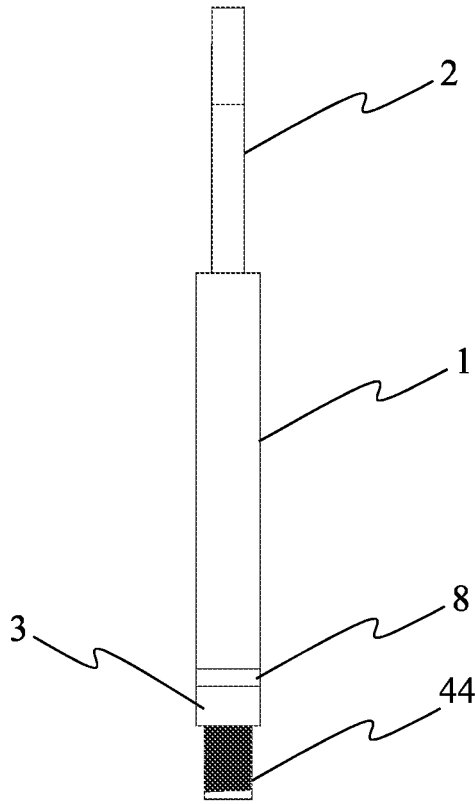
FIG. 12 is a side elevation view of the present invention in accordance with at least one embodiment.
Figure 13:
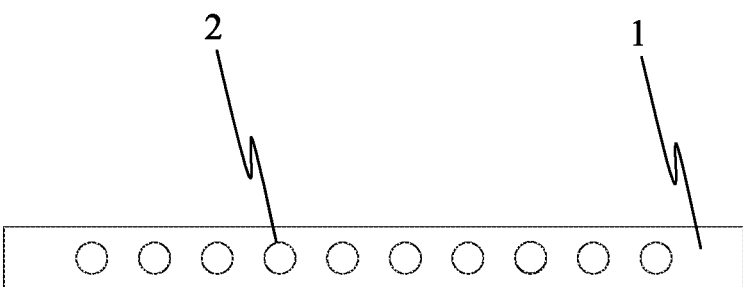
FIG. 13 is a top plan view of the present invention in accordance with at least one embodiment.
Figure 14:
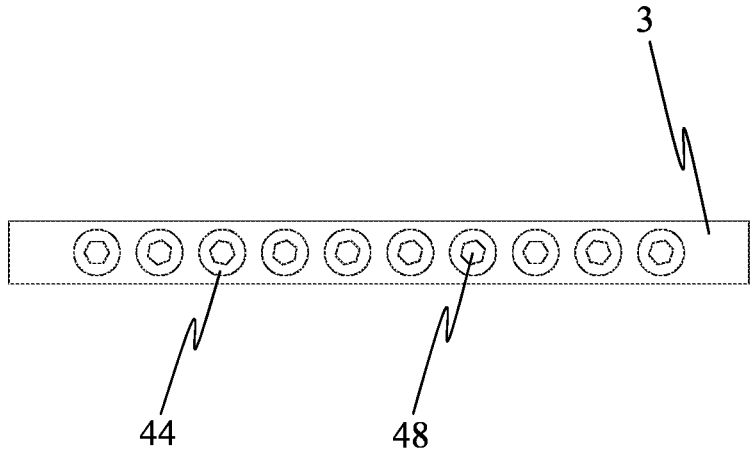
FIG. 14 is a bottom plan view of the present invention in accordance with at least one embodiment.
Figure 15:
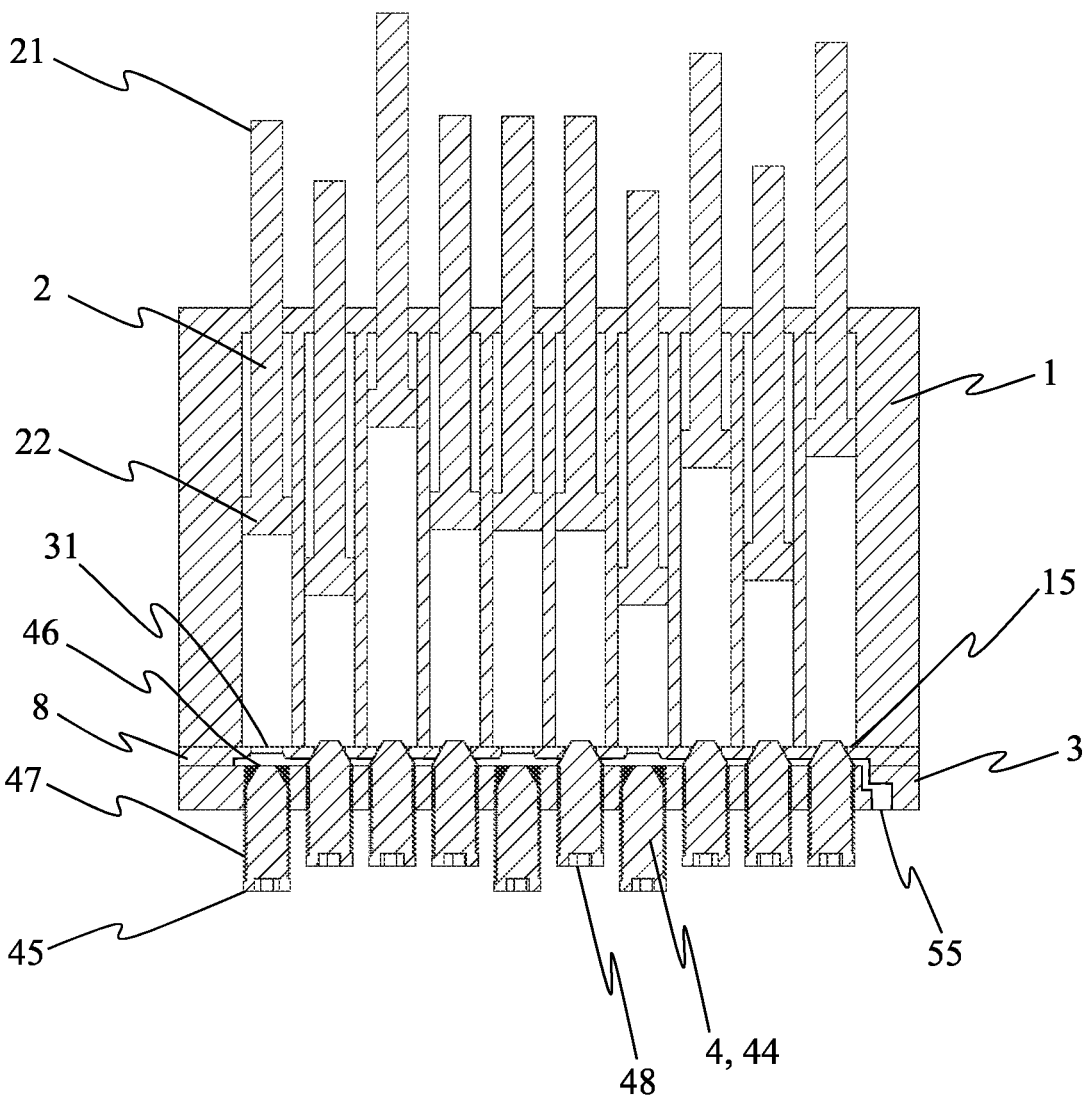
FIG. 15 is a section view of the present invention as seen in FIG. 11.

The present invention further comprises a flow regulation mechanism 4. The flow regulation mechanism 4 is attached to the housing 1 and configured to restrict or allow the flow of fluid in and out of the at least one chamber 11. The flow regulation mechanism 4 may control each of the at least one chamber 11 individually, may control a subset of the at least one chamber 11 as a group, or may control all of the at least one chamber 11 simultaneously. For example, referring to FIG. 1-9, the flow regulation mechanism 4 may comprise at least one perforated plate 41. The perforated plate 41 comprises a plurality of perforations 43. The perforated plate 41 is preferably slidingly attached between the cover 3 and the first end 12 of the housing 1, allowing the perforated plate 41 to slide between a closed position and an open position. Referring to FIG. 6-7, when the perforated plate 41 is in the closed position, the plurality of perforations 43 is arranged offset from the at least one fluid opening 15 of the chamber 11, located on the first end 12, blocking fluid flow into or out of the at least one chamber 11. Referring to FIG. 8-9, when the perforated plate 41 is in the open position, the plurality of perforations 43 is arranged in line with the at least one fluid opening 15 of the chamber 11, allowing fluid flow into or out of the at least one chamber 11.

Referring to FIG. 10-15, in an alternative embodiment, the flow regulation mechanism 4 comprises at least one regulation screw 44. The at least one regulation screw 44 includes a proximal end 45, a distal end 46, and a shaft 47. The at least one regulation screw 44 is attached to the housing 1. Preferably, one of the at least one regulation screw 44 has an exterior thread on its shaft 47 and is threadedly engaged with the cover 3. In the preferred version of this embodiment, a seat plate 8 sits between the cover 3 and the housing 1 and at least one fluid access port 31 of the seat plate 8 is tapered near the first end 12 of the at least one chamber 11, but not limited to this shape. Similarly, the at least one regulation screw 44 may be tapered on its distal end 46 to match the shape of the at least one fluid access port 31, allowing for a tight seal. Further, the at least one regulation screw 44 may include an engagement mechanism 48 on its proximal end 45, configured to engage with a screwdriver or similar tool for manual adjustment of the at least one regulation screw 44 relative to the cover 3. In addition to manual adjustment, the at least one regulation screw 44 may be controlled by a servo or stepping motor or similar actuating device. These motors may be controlled by a processor 5, programmed to configure the at least one pin 2 in a predetermined configuration.

The flow regulation mechanism 4 allows the present invention to have flexibility in its application by retaining a position of the at least one pin 2, select individually each pin of the at least one pin 2 can displace with a regulated speed, or stay in substantially the same position by closing the flow regulation mechanism 4, isolating the chamber 11, particularly when an incompressible fluid is used. This embodiment is particularly beneficial due to its capability to restrict any combination of the multiple degrees of freedom of the workpiece, depending on the shape of the workpiece, the method in which the present invention is applied to the workpiece and the work-holding devices used with the workpiece.

Figure 19:
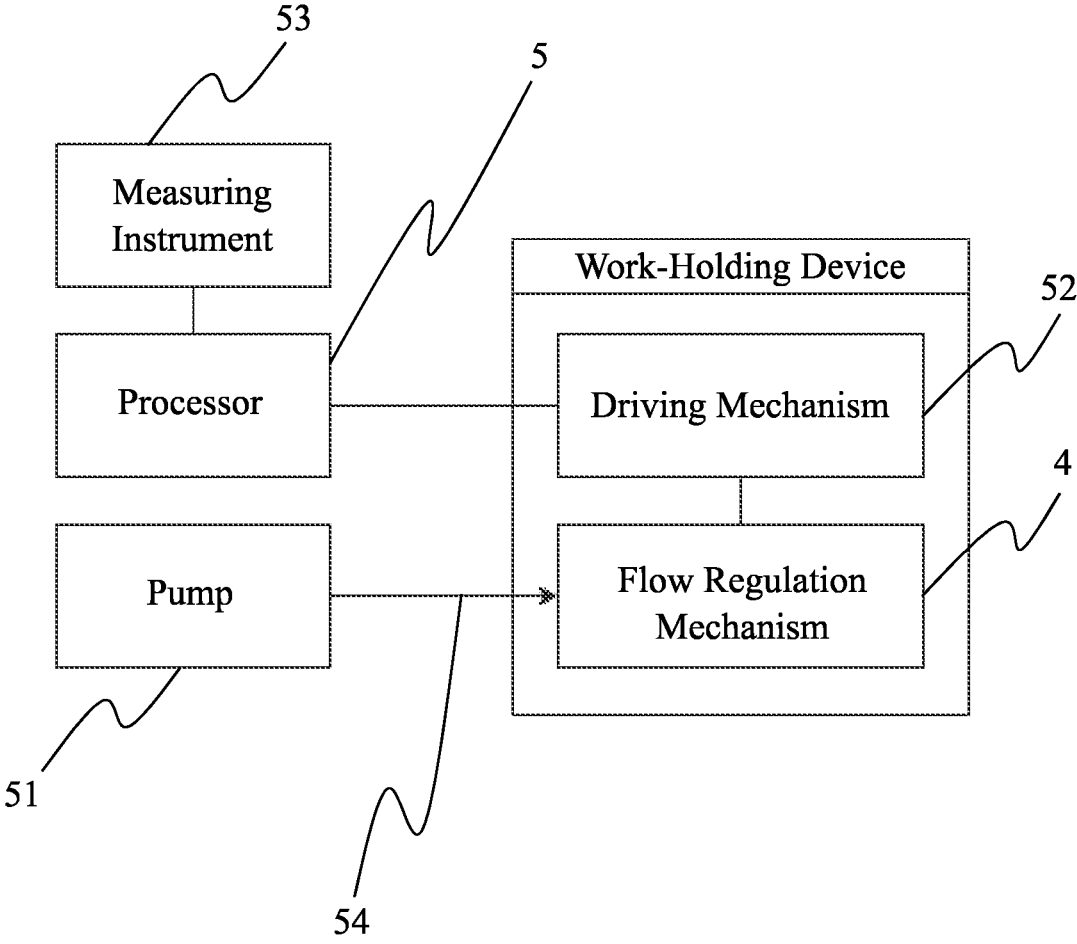
FIG. 19 is a component diagram of the interconnectivity of the components of the present invention in accordance with at least one embodiment.

In some embodiments, the flow regulating mechanism is a plurality of automatic valves (e.g. electro-valves manifold), particularly hydraulic type thanks to the higher amount of pressure achievable and being an almost incompressible fluid, that close in the exact position where the at least one pin 2 will form the desire shape. The positioning of the pins is done by comparing the current position of all the device pins to a computerized master model containing all the points in space. Referring to FIG. 19, with a 3D scanner, camera, laser, electromagnetic scale, or similar measuring instrument 53, the processor 5 is able to take the measurements and compare them with the wanted final digital model, commanding a driving mechanism 52 that actuates on the flow regulation mechanism 4 and this last act on at least one pin 2. The driving mechanism 52 may be a plurality of valves organized into a manifold. Once a pin 2 is detected in the correct position, the processor 5 sends a signal to the individual valve, fixing the position in space for that particular pin. This same process is repeated simultaneously to all the device's pins to obtain the desired shape. This relationship between the processor 5 and the plurality of valves may also apply for any other type of flow regulation mechanism 4 described herein. Such a system is more effective in an embodiment allowing for individual pin adjustment than an embodiment using the perforated plate 41 or similar mechanism that controls multiple pins at a time.

Another similar composition to achieve the positioning of the pins in any shape with use of a master computerized 3D model is by connecting a fluid feeding line 54 to one of the at least one chamber 11 at a time. The alignment of the feeding line 54 is by use of a two axis (e.g. X-Y) linear guide motion system or similar positioning system, acting as driving mechanism 52. An electro-valve is incorporated in the feeding line 54 to command when the pin will extend, retract or stay still in position. At the end of the feeding line 54, a feeding port with a sealing rubber or similar is constantly in contact with the first end 12 of the chamber. When the valve opens, the fluid pushes the particular pin of the at least one pin 2 which the fluid line is positioned at that particular moment. This system allows for a slower positioning of the pins than the manifold system previously described, (1/1 valve-pin relation) in exchange for simplicity of signaling and computing commands. In order to be functional and keep the applicable pressure on each pin, the flow regulation mechanism in this embodiment may comprise a check valve 7 and a check valve opener 6 for each of the at least one chamber 11 as shown in FIGS. 17-18 and 21-23. The check valve 7 prevents back flow of fluid out of the at least one chamber 11 and the check valve opener 6 is configured to engage the check valve 7, allowing flow out of the at least one chamber 11. The cover 3 may not be required to act as a distribution chamber for the multiple pins in this embodiment. For the purpose of retrieving the fluid inside the at least one chamber 11, each of the at least one chamber 11 may include a check valve opener 6 for regulating the opening and closing of the at least one chamber 11 or installed in the guide motion system, in contact with the first end 12. One embodiment of the check valve opener 6 comprises a rod 61 and a spring 62 to engage a check valve 7 with a displaceable closing element 71. The check valve 7 is installed at the first end 12 of the at least one chamber 11. Additionally, the feeding line 54 may further comprise an electro-valve 56 to prevent flow of fluid from the feeding line 54 between chambers 11. Referring to the check valve opener 6, the rod 61 forces the closing element 71 of the check valve 7 into its open position, allowing the interconnection between the feeding line 54 (filling or evacuation of the at least one chamber 11) and the particular chamber 11. When the feeding line 54 moves out from one chamber 11 to another chamber 11 by the linear guide motion system, the rod 61 is retracted and the previous position check valve 7 is automatically closed as the closing element 71 seals the check valve 7.

Figure 16:
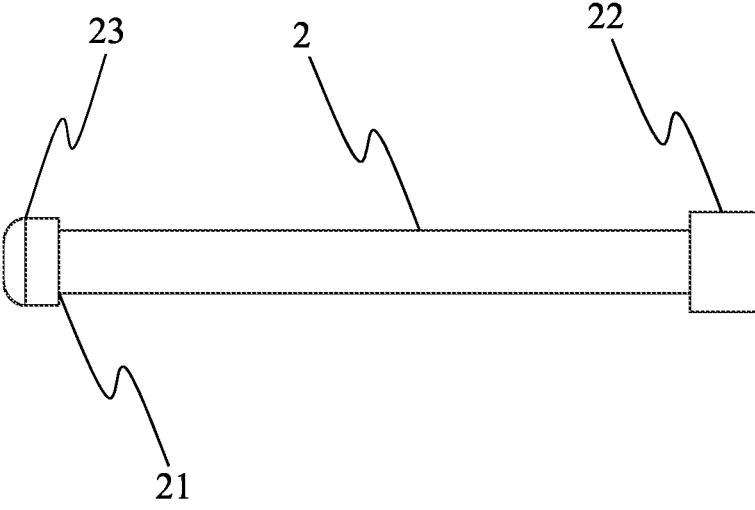
FIG. 16 is a side elevation view of a pin of the present invention with a pin cap, in accordance with at least one embodiment.
Figure 17:
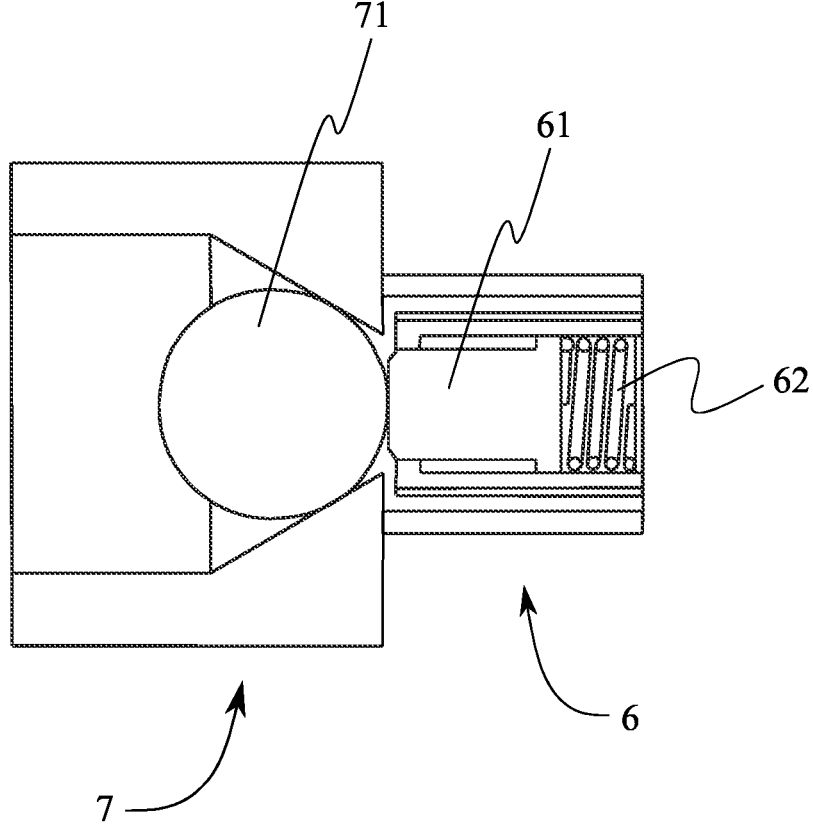
FIG. 17 is a diagram of the check valve and check valve opener of the present invention in a closed position in accordance with at least one embodiment.
Figure 18:
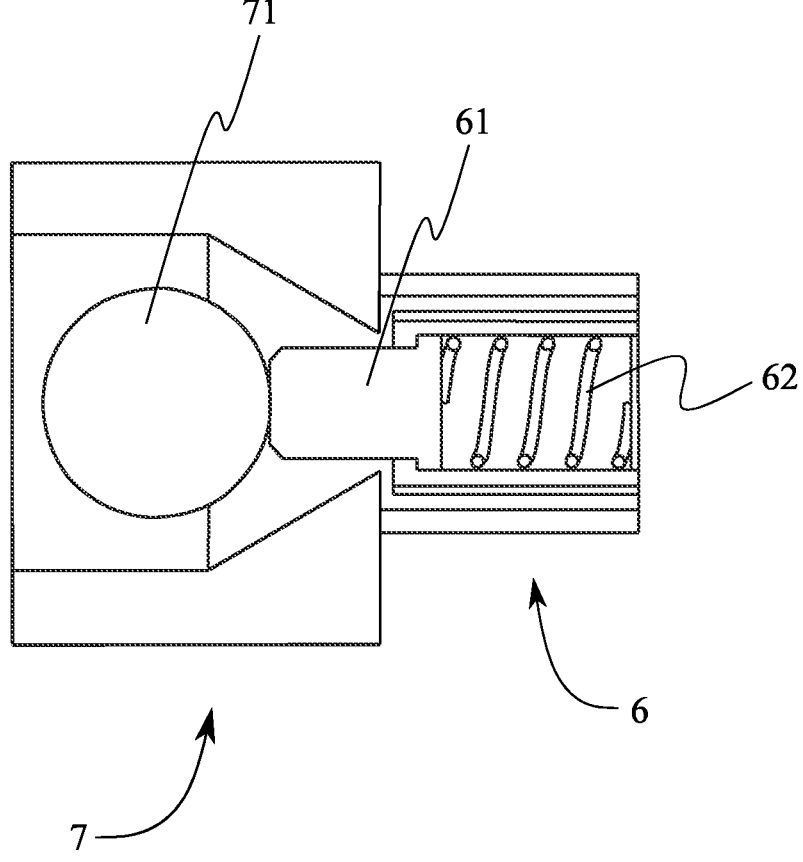
FIG. 18 is a diagram of the check valve and check valve opener of the present invention in an open position in accordance with at least one embodiment.

Referring to FIG. 16, the at least one pin 2 of the present invention may also incorporate a removable pin tip 23. The pin tip 23 is configured to fit on the actuating end 21 of the at least one pin 2 and is configured to be removed and replaced. The pin tip 23 may be made of different composition and gripping surface shapes. In many cases where the object to be fixed or clamp is fragile and can be easily damaged, deformed or broke; a soft pin tip 23 made of rubber, plastic, or soft metals such as aluminum or brass, or any other material that gives an improvement for the fixing challenge can be installed over the actuating end 21 of the at least one pin 2. Another example is changing the gripping surface shape for hardened diamond/pointing shaped forms that will penetrate or deform the object's surface to be fixed, improving the gripping strength.

The pin tip 23 may be installed by pressure through a "push-on connection", similar to a collet, where the pin tip 23 and the pin's size interfere, but because of the pin tip 23 wall thickness, the tip can have an elastic deformation assuring a tight installation over the pin. Alternatively, the pin tip 23 may comprise an internal thread to pair with an external thread on the actuating end 21 of the at least one pin 2.

The invention is a functional unit in its own but also can be configured as a family of devices working in unity, forming an extended surface (mounted side by side), or installed in a variety of positions and acting direction angles, optimizing as a system the way complex objects are fixed. To create the system a pump 51 or other powering means and distribution lines are connected to all the devices, for a centralized actuation. One exemplary illustration of a configuration of the present invention is shown in FIG. 20.

While the present invention is described herein primarily as a clamping device, the present invention may also be used to create a negative mold or die for aiding in manufacturing. In such an application, the pins may be adjusted to positions manually or automatically as described above to match a predetermined shape. Further, a flexible membrane may be used in conjunction with the pins to create a continuous sheet in the desired form.

Although the invention has been explained in relation to its preferred embodiment, it is to be understood that many other possible modifications and variations can be made without departing from the spirit and scope of the invention.

What is claimed is:

1. A work-holding device, comprising:
   a housing;
   at least one pin;
   a flow regulation mechanism;
   a processor;
   a driving mechanism;
   the housing comprising at least one chamber having a first end and a second end;
   the at least one chamber having a fluid opening at the first end;
   the at least one chamber having a pin opening at the second end;
   the at least one pin having an actuating end and a base end;
   the base end of the at least one pin arranged within the at least one chamber;
   the actuating end of the at least one pin extending through the pin opening;

the flow regulation mechanism attached to the housing; and the flow regulation mechanism being configured to regulate fluid flow into and out of the at least one chamber;

the driving mechanism configured to mechanically adjust the flow regulation mechanism to achieve a desired position for the at least one pin;

the processor being communicatively connected to the driving mechanism;

at least one feeding line, configured to introduce fluid into the at least one chamber and to extract fluid from the at least one chamber;

the flow regulation mechanism comprising a check valve and a check valve opener;

the check valve configured to prevent back flow of fluid out of the at least one chamber;

the check valve opener configured to permit extraction of fluid from the at least one chamber;

the driving mechanism being an X-Y axis linear guide motion system;

the driving mechanism configured to place the at least one feeding line in connection with the fluid opening of the at least one chamber;

an electro valve, configured to selectively allow flow of fluid from the at least one feeding line; and the check valve opener being installed on the driving mechanism.

2. The work-holding device of claim 1, further comprising:

the actuating end of the at least one pin being smaller than the pin opening;

the base end of the at least one pin being larger than the pin opening;

the pin opening forming a bushing surrounding the actuating end of the at least one pin, the bushing configured to brush debris off the actuating end of the at least one pin.

3. The work-holding device of claim 1, further comprising:

the at least one pin further comprising a pin tip;

the pin tip being removably attached to the actuating end of the at least one pin; and the pin tip comprising at least one of rubber, plastic, aluminum, or brass.

4. The work-holding device of claim 1, further comprising:

a measuring instrument;

the measuring instrument being communicatively connected to the processor; and the measuring instrument being configured to determine the desired position for the at least one pin.

5. A work-holding device, comprising:

a housing;

at least one pin;

a flow regulation mechanism;

a processor;

a driving mechanism;

a measuring instrument;

the housing comprising at least one chamber having a first end and a second end;

the at least one chamber having a fluid opening at the first end;

the at least one chamber having a pin opening at the second end;

the at least one pin having an actuating end and a base end;

the base end of the at least one pin arranged within the at least one chamber;

the actuating end of the at least one pin extending through the pin opening;

the flow regulation mechanism being configured to regulate fluid flow into and out of the at least one chamber;

the driving mechanism configured to mechanically adjust the flow regulation mechanism;

the processor being communicatively connected to the driving mechanism;

the measuring instrument being communicatively connected to the processor;

the measuring instrument being configured to determine a desired position for the at least one pin;

at least one feeding line, configured to introduce fluid into the at least one chamber and to extract fluid from the at least one chamber;

the flow regulation mechanism comprising a check valve and a check valve opener;

the check valve configured to prevent back flow of fluid out of the at least one chamber;

the check valve opener configured to permit extraction of fluid from the at least one chamber;

the driving mechanism being an X-Y axis linear guide motion system;

the driving mechanism configured to place the at least one feeding line in connection with the fluid opening of the at least one chamber;

an electro valve, configured to selectively allow flow of fluid from the at least one feeding line; and the check valve opener being installed on the driving mechanism.

6. The work-holding device of claim 5, further comprising:

the flow regulation mechanism attached to the housing.

7. The work-holding device of claim 5, further comprising:

the actuating end of the at least one pin being smaller than the pin opening;

the base end of the at least one pin being larger than the pin opening; and the pin opening forming a bushing surrounding the actuating end of the at least one pin, the bushing configured to brush debris off the actuating end of the at least one pin.

8. The work-holding device of claim 5, further comprising:

the at least one pin further comprising a pin tip; and the pin tip being removably attached to the actuating end of the at least one pin; and the pin tip comprising at least one of rubber, plastic, aluminum, or brass.

* * * * *